United States Patent
Alves et al.

(10) Patent No.: US 12,452,355 B2
(45) Date of Patent: Oct. 21, 2025

(54) CONTAINER MAGNETIC DEVICE MOUNT

(71) Applicant: Scosche Industries, Inc., Oxnard, CA (US)

(72) Inventors: Kasidy Alves, Oxnard, CA (US); Vince Alves, Oxnard, CA (US); Yasuhiro Yamamoto, Thousand Oaks, CA (US)

(73) Assignee: Scosche Industries, Inc., Oxnard, CA (US)

( * ) Notice: Subject to any disclaimer, the term of this patent is extended or adjusted under 35 U.S.C. 154(b) by 17 days.

(21) Appl. No.: 18/333,240

(22) Filed: Jun. 12, 2023

(65) Prior Publication Data

US 2023/0403352 A1 Dec. 14, 2023

Related U.S. Application Data

(63) Continuation-in-part of application No. 17/648,945, filed on Jan. 26, 2022, now abandoned.

(51) Int. Cl.
*H04M 1/04* (2006.01)
*B65D 1/02* (2006.01)
(Continued)

(52) U.S. Cl.
CPC ............ *H04M 1/04* (2013.01); *B65D 1/0207* (2013.01); *B65D 43/02* (2013.01); *H04B 1/3877* (2013.01); *H04M 2201/08* (2013.01)

(58) Field of Classification Search
CPC ... A47G 19/2227; A47G 19/2272; F16B 1/00; F16B 2001/0035
See application file for complete search history.

(56) References Cited

U.S. PATENT DOCUMENTS

| 3,329,277 A | 7/1967 | Gaudino |
| 3,642,122 A | 2/1972 | Von Ende |

(Continued)

FOREIGN PATENT DOCUMENTS

| CN | 201113495 Y | 9/2008 |
| CN | 202042680 U | 11/2011 |

(Continued)

OTHER PUBLICATIONS

The Original iMagnet Cradle-Less Universal Car Phone Windsheild Dashboard Mount Holder for iPhone 6, 6 Plus, 6S, 6S Plus, 5S 5, Galaxy S6 S5, Note 5 4 3, With Offical iMagnet Logo, iMagnet, Amazon.com, Aug. 19, 2012.

(Continued)

*Primary Examiner* — Monica E Millner
(74) *Attorney, Agent, or Firm* — Stetina Garred Brucker & Newboles

(57) ABSTRACT

A container magnetic mount for a device has a container lid defined by a rim cylindrical wall, a top, and a lid joint element. A lever arm has an arm joint element in rotating engagement with the container lid. The lid joint element and the lever arm joint element define a dynamic coupling with the lever arm being orientable between one or more arbitrary raised positions and a lowered position. The container magnetic mount also includes a device mount head integrated with the lever arm and one or more magnets that are attractive of a ferromagnetic element on the device. A face of the device mount head is fixed at a prescribed angle relative to the lever arm.

19 Claims, 8 Drawing Sheets

(51) Int. Cl.
  *B65D 43/02* (2006.01)
  *H04B 1/3877* (2015.01)

(56) References Cited

U.S. PATENT DOCUMENTS

| | | | |
|---|---|---|---|
| 4,047,787 A | 9/1977 | Gumb et al. |
| 4,070,078 A | 1/1978 | Chrones |
| 4,903,870 A | 2/1990 | La Vange |
| D306,396 S | 3/1990 | Brushaber |
| D317,697 S | 6/1991 | Lage |
| D327,840 S | 7/1992 | Askew |
| 5,213,240 A | 5/1993 | Dietz et al. |
| 5,272,281 A | 12/1993 | Bouley |
| 5,369,565 A | 11/1994 | Chen et al. |
| D362,230 S | 9/1995 | Yokozawa |
| D362,657 S | 9/1995 | Tomikawa et al. |
| 5,556,289 A | 9/1996 | Holbrook, Jr. |
| D398,796 S | 9/1998 | Fauchald et al. |
| 5,989,052 A | 11/1999 | Fields et al. |
| 5,992,807 A | 11/1999 | Tarulli |
| 6,075,499 A | 6/2000 | Edwards et al. |
| 6,076,790 A | 6/2000 | Richter |
| 6,135,408 A | 10/2000 | Richter |
| 6,149,116 A | 11/2000 | Won |
| 6,305,656 B1 | 10/2001 | Wemyss |
| 6,382,482 B1 | 5/2002 | Chao |
| 6,502,727 B1 | 1/2003 | Decoteau |
| 6,594,051 B1 | 7/2003 | Chaplin et al. |
| D479,196 S | 9/2003 | Shih |
| D489,578 S | 5/2004 | Lai |
| 6,888,940 B1 | 5/2005 | Deppen |
| 7,021,593 B1 | 4/2006 | Fan |
| D521,850 S | 5/2006 | Richter et al. |
| D530,333 S | 10/2006 | Richter |
| D543,439 S | 5/2007 | Brassard |
| D551,058 S | 9/2007 | Carnevali |
| D552,454 S | 10/2007 | Fynn |
| D553,959 S | 10/2007 | Brassard |
| D554,042 S | 10/2007 | Richter |
| D554,491 S | 11/2007 | Stenberg |
| 7,296,771 B2 | 11/2007 | Kalis et al. |
| D560,592 S | 1/2008 | Brassard |
| D563,309 S | 3/2008 | Richter |
| D565,937 S | 4/2008 | Tsai |
| 7,374,142 B2 | 5/2008 | Carnevali |
| D570,836 S | 6/2008 | Chen |
| D574,383 S | 8/2008 | Maruyama et al. |
| D576,865 S | 9/2008 | Chiang et al. |
| 7,422,184 B2 | 9/2008 | Carnevali |
| 7,431,251 B2 | 10/2008 | Carnevali |
| D588,903 S | 3/2009 | Carnevali |
| D590,835 S | 4/2009 | Richter |
| D592,205 S | 5/2009 | O'Brien |
| D600,991 S | 9/2009 | Lai |
| D603,322 S | 11/2009 | Nicieja |
| D609,644 S | 2/2010 | Lin |
| D611,407 S | 3/2010 | Webb |
| D617,268 S | 6/2010 | Yen |
| 7,913,869 B2 | 3/2011 | Cuocolo, Jr. |
| D638,008 S | 5/2011 | Richter |
| 7,954,773 B2 | 6/2011 | Carnevali |
| 8,016,255 B2 | 9/2011 | Lin |
| D651,564 S | 1/2012 | Workman et al. |
| D654,874 S | 2/2012 | Au |
| D656,465 S | 3/2012 | Au |
| D656,899 S | 4/2012 | Webb et al. |
| D670,157 S | 11/2012 | Mo |
| D671,074 S | 11/2012 | Hori et al. |
| 8,354,909 B2 | 1/2013 | Fullerton et al. |
| D677,709 S | 3/2013 | Skeoch et al. |
| 8,408,414 B2* | 4/2013 | Roth .................. B65D 45/025 |
| | | | 220/814 |
| D681,867 S | 5/2013 | Wegger et al. |
| D686,595 S | 7/2013 | Stringer et al. |
| 8,496,222 B2 | 7/2013 | Li |
| D687,441 S | 8/2013 | Janzen |
| D694,249 S | 11/2013 | Kerr et al. |
| 8,602,376 B2 | 12/2013 | Vogel et al. |
| D700,175 S | 2/2014 | Ohm |
| 8,668,106 B1 | 3/2014 | Joy et al. |
| D705,211 S | 5/2014 | Huang |
| D709,066 S | 7/2014 | Byun |
| D709,072 S | 7/2014 | Askew-Harris et al. |
| D709,445 S | 7/2014 | Yeh |
| 8,777,039 B2 | 7/2014 | Roth et al. |
| D713,398 S | 9/2014 | Alesi et al. |
| D715,132 S | 10/2014 | Mcsweyn et al. |
| D716,304 S | 10/2014 | Orthey |
| D718,612 S | 12/2014 | Mcsweyn et al. |
| D719,959 S | 12/2014 | Vogel |
| 9,163,775 B2 | 10/2015 | Rohrbach |
| D792,409 S | 7/2017 | Shim |
| D799,320 S | 10/2017 | Goodwin et al. |
| 9,800,283 B2* | 10/2017 | Schmidt .............. F16M 11/242 |
| 9,853,507 B2 | 12/2017 | Jol et al. |
| D817,269 S | 5/2018 | Sukphist et al. |
| 10,105,012 B2* | 10/2018 | Yurkovetskaya .. B65D 43/0231 |
| 10,155,482 B2 | 12/2018 | Corso |
| 10,571,068 B2* | 2/2020 | Law ....................... F16M 13/02 |
| 10,654,619 B2* | 5/2020 | Teper ..................... B65D 23/10 |
| D886,735 S | 6/2020 | Yamamoto et al. |
| D887,349 S | 6/2020 | Yamamoto et al. |
| D887,350 S | 6/2020 | Yamamoto et al. |
| 10,717,396 B2 | 7/2020 | Macneil et al. |
| 10,778,020 B1 | 9/2020 | Torem |
| D899,361 S | 10/2020 | Lv et al. |
| D909,968 S | 2/2021 | Chen |
| 10,946,811 B1* | 3/2021 | Chen ..................... H04B 1/3877 |
| 10,954,035 B2 | 3/2021 | Fromme |
| 10,967,807 B1* | 4/2021 | Hessheimer ........ B60R 11/0241 |
| 11,038,996 B2* | 6/2021 | Iverson ..................... H04M 1/04 |
| 11,117,526 B2* | 9/2021 | Iverson ..................... B60R 11/02 |
| D938,351 S | 12/2021 | Yamamoto et al. |
| 11,338,971 B1 | 5/2022 | Capper et al. |
| 11,619,248 B1* | 4/2023 | Straney ................ F16M 13/022 |
| | | | 248/229.12 |
| 2005/0075700 A1 | 4/2005 | Schommer et al. |
| 2005/0092875 A1 | 5/2005 | Carnevali |
| 2006/0290654 A1 | 12/2006 | Wang |
| 2007/0002533 A1 | 1/2007 | Kogan et al. |
| 2007/0018064 A1 | 1/2007 | Wang |
| 2008/0023606 A1 | 1/2008 | Kalis et al. |
| 2009/0134838 A1 | 5/2009 | Raghuprasad |
| 2010/0033127 A1 | 2/2010 | Griffin, Jr. et al. |
| 2010/0156345 A1 | 6/2010 | Phelps, III |
| 2010/0219693 A1 | 9/2010 | Azancot et al. |
| 2010/0238655 A1 | 9/2010 | Sloan et al. |
| 2011/0074344 A1 | 3/2011 | Park et al. |
| 2011/0192857 A1 | 8/2011 | Rothbaum et al. |
| 2011/0241608 A1 | 10/2011 | Adamczyk et al. |
| 2012/0202427 A1 | 8/2012 | Gioscia et al. |
| 2012/0229300 A1 | 9/2012 | Fu |
| 2012/0292463 A1 | 11/2012 | Burns |
| 2012/0295451 A1 | 11/2012 | Hyun-Jun et al. |
| 2013/0043827 A1 | 2/2013 | Weinstein et al. |
| 2013/0154566 A1 | 6/2013 | Emslie |
| 2013/0157483 A1 | 6/2013 | Ge et al. |
| 2013/0187020 A1 | 7/2013 | Trotsky |
| 2014/0061248 A1 | 3/2014 | Hoskins |
| 2014/0069918 A1* | 3/2014 | Meyers ................ B65D 51/242 |
| | | | 220/212.5 |
| 2014/0346295 A1 | 11/2014 | Song |
| 2014/0347795 A1 | 11/2014 | Baca |
| 2014/0357094 A1 | 12/2014 | Kim |
| 2014/0368163 A1 | 12/2014 | Ho |
| 2015/0008875 A1 | 1/2015 | Huang et al. |
| 2015/0162767 A1 | 6/2015 | Oh et al. |
| 2015/0207351 A1 | 7/2015 | Hamburgen et al. |
| 2015/0235532 A1 | 8/2015 | Marszalek et al. |
| 2015/0288205 A1 | 10/2015 | Weinstein et al. |
| 2016/0161052 A1 | 6/2016 | Griggs |
| 2016/0236819 A1 | 8/2016 | Yurkovetskaya et al. |
| 2016/0259374 A1 | 9/2016 | Breiwa et al. |
| 2016/0373152 A1 | 12/2016 | Schmidt |

(56) References Cited

U.S. PATENT DOCUMENTS

| | | | |
|---|---|---|---|
| 2017/0003711 A1* | 1/2017 | Rowley | F16B 47/00 |
| 2017/0033579 A1 | 2/2017 | Maguire et al. | |
| 2017/0104297 A1 | 4/2017 | Scott et al. | |
| 2017/0214260 A1 | 7/2017 | Kim | |
| 2017/0225833 A1 | 8/2017 | Ni | |
| 2017/0253394 A1 | 9/2017 | Fogarty et al. | |
| 2017/0271900 A1 | 9/2017 | Rose et al. | |
| 2017/0283132 A1 | 10/2017 | Sorensen et al. | |
| 2017/0288469 A1 | 10/2017 | Murashige et al. | |
| 2017/0317444 A1 | 11/2017 | Narayanasamy et al. | |
| 2017/0346317 A1 | 11/2017 | Hodges et al. | |
| 2018/0025826 A1 | 1/2018 | Nishimura et al. | |
| 2018/0228280 A1 | 8/2018 | Li et al. | |
| 2018/0248406 A1 | 8/2018 | Bae et al. | |
| 2018/0334280 A1 | 11/2018 | Ni | |
| 2018/0335201 A1 | 11/2018 | Redpath et al. | |
| 2019/0063667 A1 | 2/2019 | Law et al. | |
| 2019/0075914 A1* | 3/2019 | Teper | A45F 3/18 |
| 2019/0208898 A1 | 7/2019 | Koo | |
| 2019/0341791 A1 | 11/2019 | Grifoni | |
| 2021/0179321 A1* | 6/2021 | Karbakhsh | A45F 3/18 |
| 2022/0055798 A1 | 2/2022 | Morris et al. | |
| 2022/0080900 A1* | 3/2022 | Nguyen | A47G 19/2205 |
| 2022/0212608 A1* | 7/2022 | McSweyn | B60R 11/02 |
| 2023/0233006 A1* | 7/2023 | Alves | A47G 19/2227 |
| | | | 248/213.2 |

FOREIGN PATENT DOCUMENTS

| | | |
|---|---|---|
| CN | 203193688 U | 9/2013 |
| CN | 203416030 U | 1/2014 |
| CN | 206195404 U | 5/2017 |
| CN | 108306391 A | 7/2018 |
| JP | 2000231910 A | 8/2000 |
| KR | 101718729 B1 | 3/2017 |
| KR | 101790891 B1 | 10/2017 |
| WO | 2017069326 A1 | 4/2017 |
| WO | 2018093022 A1 | 5/2018 |

OTHER PUBLICATIONS

Clever smartphone case offers an ingenious way to charge your phone on the go; Jun. 20, 2014 http://bgr.com/2014/06/20/best-smartphone-accessories-zolo/.
Logitech Case+ Review: Brilliant iPhone Case Concept, Flawed Execution; May 13, 2014 http://time.com/98112/logitech-case-plus-review/.
Magnetic Nanoport links phones to accessories, cars, each other; Jan. 7, 2014 http://www.cnet.com/news/magnetic-nanoport-links-phones-to-accessories-cars-each-other/.
Supermagnete, "Data sheet article S-20-03-N52N"; Dec. 3, 2015.
Mounts posted by Scoshe found on Sep. 27, 2016 at http://www.scosche.com/consumer-tech/mounts.
International Search Report & Written Opinion for Application No. PCT/US2019/068589; dated Mar. 19, 2020.
European Search Report and Opinion for Application No. EP19214118 (dated Mar. 19, 2020).

* cited by examiner

CONTAINER MAGNETIC DEVICE MOUNT

CROSS-REFERENCE TO RELATED APPLICATIONS

The application is a continuation-in-part patent application of U.S. patent application Ser. No. 17/648,945 filed Jan. 26, 2022 and entitled "Container Magnetic Device Mount", the entirety of the disclosure of which is hereby incorporated by reference.

STATEMENT RE: FEDERALLY SPONSORED RESEARCH/DEVELOPMENT

Not Applicable

BACKGROUND

1. Technical Field

The present disclosure relates generally to mounts for positioning, orienting, and securing smartphones and other electronic devices for optimal usage, and more particularly, to a container magnetic device mount.

2. Related Art

A wide variety of portable electronic devices are currently in existence on the market, though there has been a recent convergence towards a fewer category of devices that fulfill many needs. Typically, these are smartphones that which integrate functions and features that may have earlier been provided in separate, independent devices such as music players, gaming consoles, personal digital assistants, digital still and video cameras, electronic readers, mapping and navigation devices, and so on. Several short-to-medium range communications modalities are also integrated, including WiFi and Bluetooth for short-range/local data transfer links, as well as cellular communications systems that can substantially extend its communicative range.

When interacting with the smartphone for a brief moment, it may be held in the hand and placed back down following use. However, there may be some situations in which the user is performing a primary task not with or relating to the smartphone, such as while working out/exercising, but there is still a need or desire for viewing the display and/or interacting with the mobile device. Some exercise routines may call for extended durations of cardiovascular activity with such machines as treadmills, ellipticals, stationary bikes, and rowing machines. In order to avoid boredom, or to make productive use of otherwise idle time, a user may opt to view entertainment or educational programming on the smartphone. Along these lines, a smartphone may be utilized to view live or pre-recorded videos that guide the user along a workout routine. Performance in athletic activities may be improved through visual feedback of one's performance no matter the skill or ability, so instead of just viewing content, the smartphone may be utilized for recording videos of the user performing exercise routines. The captured footage may be immediately reviewed or stored for subsequent review by the user and/or by third parties such as coaches.

As can be appreciated, short of wearing a band with a device holder around the arm, torso, or leg, a loosely held/pocketed smartphone is liable to be thrown about during vigorous activity. Many conventional exercise machines therefore incorporate shelves, ledges, pockets, and like structures throughout its housing, where smartphones may be placed. Most such structures are intended for merely holding the smartphone while the user is engaged in the exercise activity, rather than positioning the display at an optimal viewing angle. Exercise machines oftentimes incorporate bottle holders so that hydration is immediately accessible during the workout. Where there are no dedicated smartphone retention structures, these bottle holders may serve a dual purpose of holding smartphones, media players, and the like. Again, however, the placement and available positioning angles of the smartphone display placed in such bottle holders are typically not ideal for viewing and/or recording.

Various mounting devices have been developed for securing a smartphone to stationary structures beyond the foregoing incidental ones on an exercise machine. One configuration is a cradle that mechanically retains the smartphone, with the cradle being mounted to a structure. The compressive retention mechanisms are oftentimes cumbersome to engage and/or disengage, so more recently, magnetic mounts are being utilized. A mount head including one or more permanent magnets are fixed to the structure, with a metallic plate being attached to the rear of the smartphone. The magnets on the mount engage the metallic plate, thereby releasably engaging the smartphone to the mount.

Whether utilizing a mechanical/compressive retention or a magnetic retention, it is necessary to attach the device mount head to a base structure. This base structure may be that of the exercise machine, which may have tubular structures around which a clamp can be engaged, or a flat surface on which a suction cup or an adhesive may be attached. Furthermore, there are bottle holder mounts that are generally comprised of plugs that are insertable into the bottle holder and include stalk extensions that raise and shift the device mount head to a more idea viewing position. These mounting structures are intended for permanent or semi-permanent installation and may be unsuitable for deployment in public/commercial gyms where many people use a given machine over the course of the day. Removing and attaching the structural mount for each machine by a single user is also cumbersome and may be disruptive to a workout routine.

Beyond the foregoing exercise or workout-related uses of the smartphone to capture video and/or images of the user, there may be other circumstances in which a steady hands-free platform for a smartphone or other recording device is needed. Videoconferencing has become extremely popular for both work and personal purposes. There are several well-know smartphone-installable applications such as Zoom, Facetime, Google Meet, and so forth. Along these lines, short form videos and photographs of one's self engaged in an activity are posted to social media sites. The common thread among all of these scenarios is that there is no static location from which images or footage is captured. For example, good practice may dictate the user participating in work-related videoconferences strictly from a dedicated office space, while the same user may conduct personal videoconferences from the kitchen, living room, bedroom, or elsewhere outside. Because video content posted to social media sites are intended to highlight involvement in a range of outside activities, footage may be required from a variety of locations. While tripods may be used for more formal video shoots, setup can be cumbersome, and some locations may ban their use.

Accordingly, there is a need in the art for an improved mounting device for positioning, orienting, and securing smartphone devices. There is a need in the art for magnetic mount heads selectively extendable from personal items such as water bottles that can be placed into existing bottle holders on exercise machines as well as be free-standing. There is a need for a container magnetic device mount.

BRIEF SUMMARY

The present disclosure contemplates various embodiments of a container magnetic device mount.

One embodiment may be a container magnetic mount engageable to a structure, and may include a container lid and a device mount. The device mount may have an elongate bail arm in rotating engagement with the container lid in an offset and counterbalanced relation. The device mount may also include a mount head with one or more magnets that are attractive of a ferromagnetic element on the structure. The mount head may be fixed at a head end opposite a tail end toward the offset bias. Furthermore, the mount head may be fixed at a proscribed angle relative to the elongate bail arm.

Another embodiment of the present disclosure may be a liquid container, which may include a container body, a lid, and a device mount. The container body may be defined by a container interior and an open rim. The lid may be engageable to the open rim of the container body. The lid may also be defined by a rim cylindrical wall and a top including a platform having a rotatable spout in fluid communication with the container interior. The liquid container may also include a device mount with an elongate bail arm in rotating engagement with the lid in an offset and counterbalanced relation. The device mount may also include a mount head with one or more magnets attractive of a ferromagnetic element on the structure. The mount head may be fixed at a head end opposite a tail end toward the offset bias. The mount head may also be fixed at a proscribed angle relative to the elongate bail arm.

According to another embodiment, there may be a container magnetic mount. There may be a container lid that is defined by a rim cylindrical wall, a top, and a lid joint element. Additionally, there may be a lever arm that includes an arm joint element in rotating engagement with the container lid. The lid joint element and the lever arm joint element may define a dynamic coupling with the lever arm being orientable between one or more arbitrary raised positions and a lowered position. The container magnetic mount may also include a device mount head integrated with the lever arm and include one or more magnets that are attractive of a ferromagnetic element on the device. A face of the device mount head may be at a prescribed angle relative to the lever arm.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a container magnetic device mount and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, proximal and distal, left and right, front and rear, and the like are used solely to distinguish one from another entity without necessarily requiring or implying any actual such relationship or order between such entities.

Figure 1:
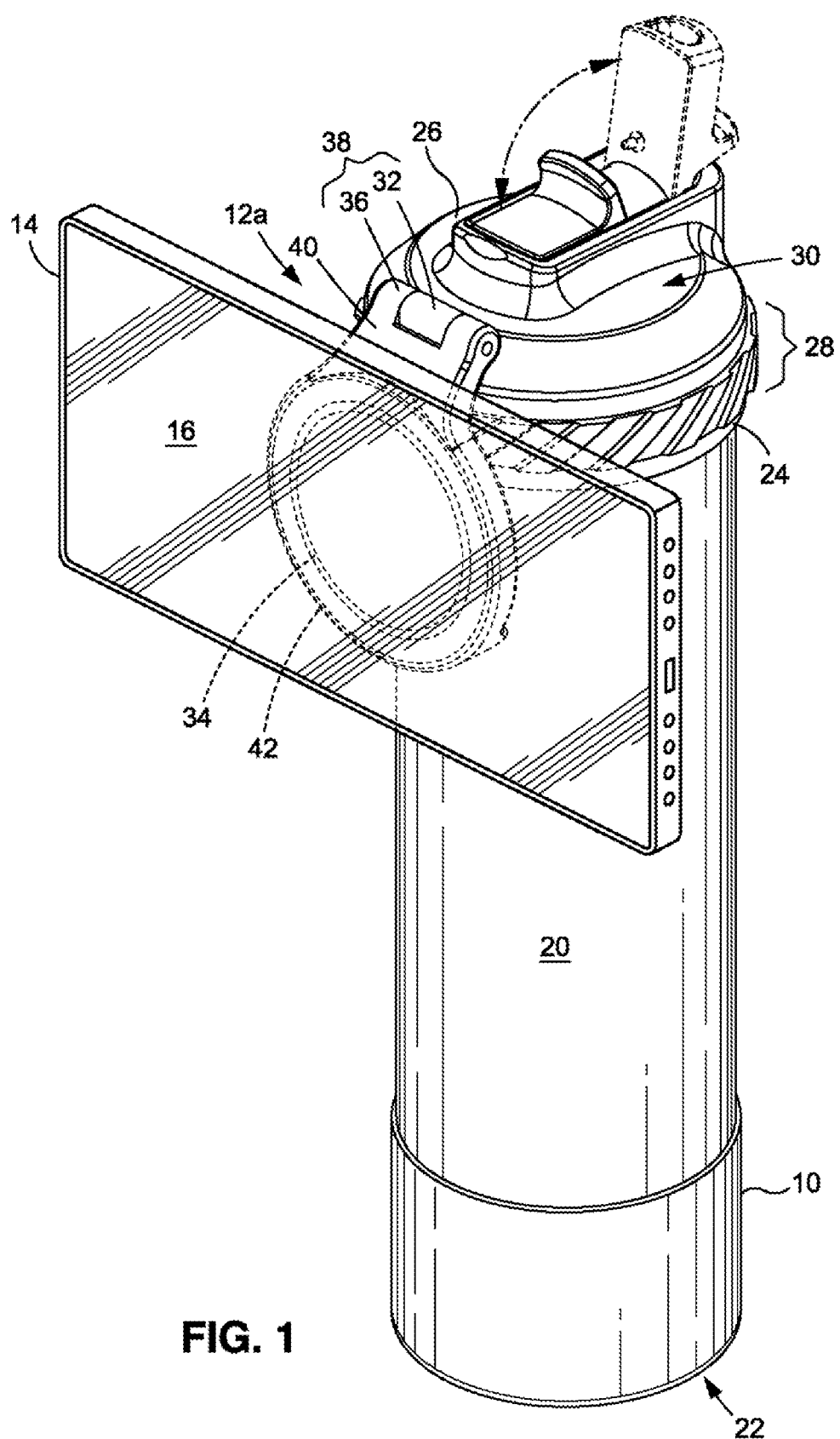
FIG. 1 is a perspective view of a first embodiment of a container magnetic mount according to the present disclosure.

FIG. 1 depicts a liquid container 10 that incorporates a first embodiment of a container magnetic mount 12a. A device 14 is shown temporarily attached to the container magnetic mount 12. The device 14 is understood to be a smartphone, a media player, or other like personal electronic device that has a front-facing display 16. The device 14 is understood to include a data processor that executes various instructions that result in outputs being generated on the display 16. Moreover, the device 14 may include wireless communications subsystems to retrieve audio and video media data that is then presented/played back on the display 16.

Various embodiments of the present disclosure contemplate the device 14, and specifically the display 16 thereof, to be positionable/orientable for optimal viewing of such media content by a user. The components of the device 14 are incorporated within a housing or case that is further defined by a rear face 18 opposite the front-facing display 16. In some cases, the rear face 18 may incorporate ferromagnetic materials to engage a corresponding magnet on an inductive charging head. Alternatively, an aftermarket metallic/ferromagnetic plate may be adhesively attached to the rear face 18.

The liquid container 10 may have a generally cylindrical configuration with a hollow interior to hold beverages such as water, juice, or sports drinks. In this regard, the liquid container 10 has a cylindrical sidewall 20 and a closed circular bottom 22. A top end 24 of the liquid container 10 is open with the cylindrical sidewall 20 defining a rim, with a lid 26 being engageable thereto. In typical implementations, an outer portion of the cylindrical sidewall 20 is threaded, with a corresponding thread defined on the interior of the lid 26 such that the lid 26 is secured to and closes off the open top end 24. The details of the thread, including the pitch and other dimensional parameters thereof are not shown, though it is deemed to be within the purview of those having ordinary skill on the art to incorporate such securing modalities into the container 10/lid 26.

According to one embodiment, the lid 26 may be generally defined by a rim cylindrical wall 28 and a circular top portion 30. Additionally, the lid 26 includes a lid joint element 32, with further structural details thereof being described more fully below. The container magnetic mount 12 has a device mount head 34 and includes a device mount head joint element 36 that is in rotating engagement with the lid joint element 32. The device mount head joint element 36 and the lid joint element 32 together define a dynamic coupling 38, such that the device mount head 34, and hence the device 14 mounted thereto, can be rotated to a desired orientation.

The device mount head 34 can have a variety of configurations, though in the first embodiment of the container magnetic mount 12 shown, there may be a joint arm 40 that includes the aforementioned device mount head joint element 36. The joint arm 40 is structurally contiguous with a head body 42, which incorporates one or more magnets that are attractive of the ferromagnetic element embedded in or attached to the rear face 18 of the device 14. The head body 42 is understood to be angularly offset relative to the joint arm 40, such that when the device mount head 34 is in the lowered position as depicted in FIG. 1, the head body 42 is substantially parallel to the rim cylindrical wall 28 and/or the cylindrical sidewall 20 of the liquid container 10.

Figures 2A, 2B:
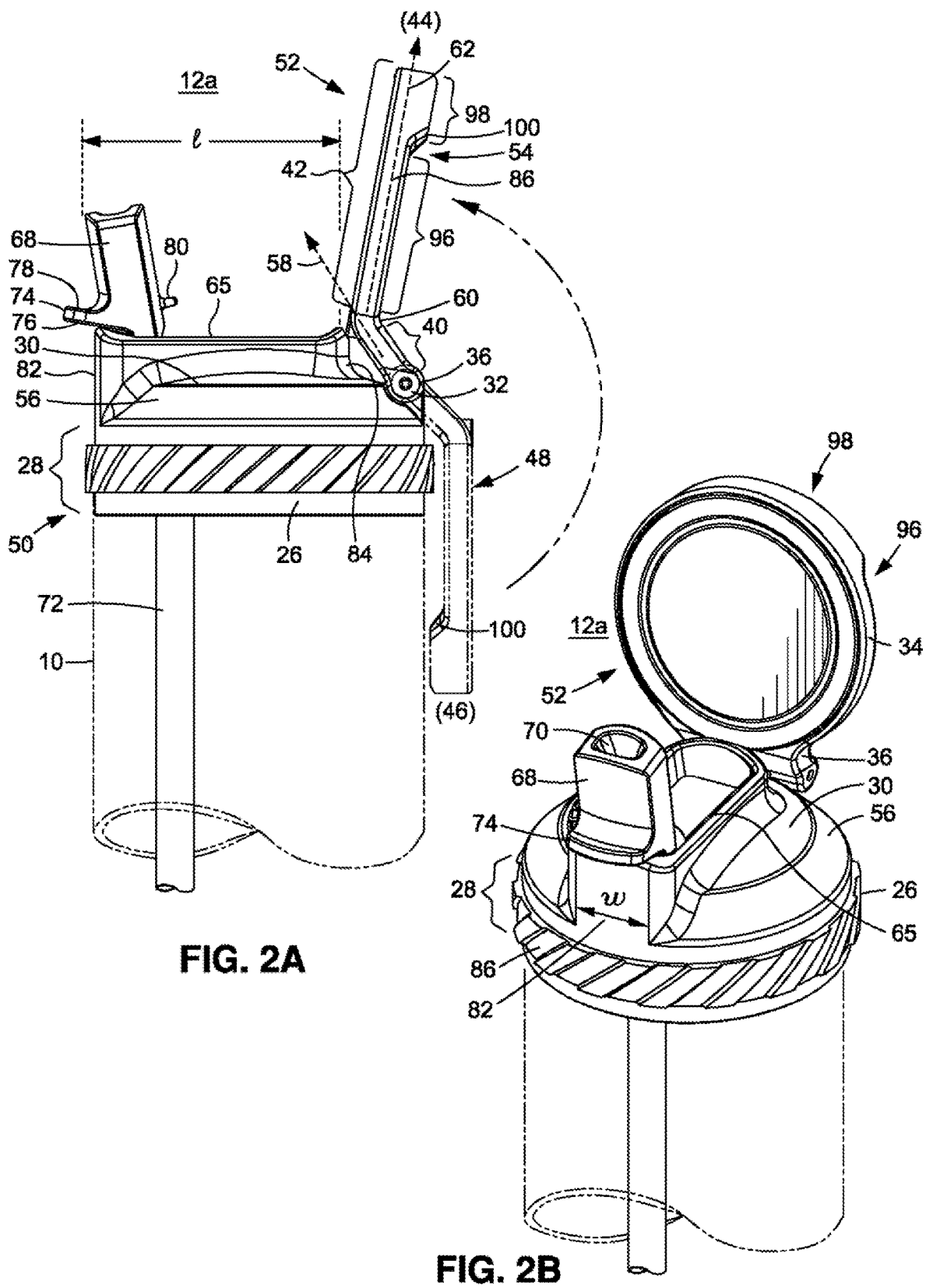
FIG. 2A is a side view of the first embodiment of the container magnetic mount showing a device mount head primarily in a reverse raised position.
FIG. 2B is a rear perspective view of the first embodiment of the container magnetic mount with the device mount head in the reverse raised position.

With reference to FIG. 2A and FIG. 2B, the device mount head 34 may be rotated between a raised reverse position 44 and a lowered forward position 46, as well as any angle in between. Only for purposes of referential consistency, the liquid container 10 and the lid 26 are understood to have forward side 48 and an opposed rearward side 50. Independent of the liquid container 10 and the lid 26t, the device mount head 34 may be defined by a front face 52 and a rear face 54. When the device mount head 34 is rotated to the raised reverse position 44, the front face 52 is oriented toward the rearward side 50. When the device mount head 34 is rotated to the lowered forward position, the front face 52 is oriented toward the forward side 48.

As indicated above, the lid 26 is defined by the rim cylindrical wall 28 and the circular top portion 30. In the illustrated embodiment, between the circular top portion 30 and the rim cylindrical wall 28 is a transition or shoulder portion 56. This shoulder portion 56 may have a spherical segment shape, that is, characterized by a curved or arcuate cross-section that generally corresponds to that of a segment of a sphere. The specific configuration of the shoulder portion 56 is presented by way of example only and not of limitation, and any other shape or geometric profile may be substituted. The lid joint element 32 extends from such shoulder portion 56 and is structurally contiguous with the lid 26, while the device mount head joint element 36 is structurally contiguous with the joint arm 40. In further detail, the joint arm 40 defines a lid arm extension axis 58 and is joined with the head body 42 at an elbow 60. The head body 42, in turn, defines a head body extension axis 62, which has a proscribed angular offset relative to the lid arm extension axis 58.

According to one embodiment, the lid 26 also incorporates a spout platform 64 on the circular top portion 30. The spout platform 64 partly bisects the circular top portion 30 and is defined by a length/and a width w. There is a spout receptacle 66 defined within the spout platform 64 that accepts a rotatable spout 68. Defined within the spout 68 is a passageway 70 that is in fluid communication with a straw or conduit 72 extending into the interior of the liquid container 10.

The spout 68 additionally incorporates a finger tab 74 that aids in the rotation of the spout between an open position and a closed position. In the closed position, it is understood that the conduit 72 is pinched off to restrict fluid flow between the passageway 70 and the conduit 72 and faces the forward side 48 of the lid 26. On the other hand, in the open position, the spout 68 extends generally upwardly, and slightly angled toward the rearward side 50 of the lid 26. The finger tab 74 may be defined by a front end 76 and an opposed rear end 78, with the rotational extent of the finger tab 74 being limited by the obstruction of an upper rim 65 of the spout platform 64 against the front end 76 of the finger tab 74. The side of the spout 68 opposite the finger tab 74 may include an airway plug 80 that blocks an opening on the lid 26 to the interior of the liquid container 10. This opening is understood to aid in equalizing the pressure in the liquid container 10 as liquid flows out therefrom through the passageway 70. With the spout 68 rotated to the closed position and the airway plug 80 blocking the opening, a further restriction of liquid outflow additional to the pinched off passageway 70 may be provided.

The spout platform 64 has a vertical wall 82 on the rearward side 50 of the lid 26 that is generally coextensive with the rim cylindrical wall 28. The opposing vertical wall 84 on the forward side 48 of the lid 26 may similarly limit the rotation of the device mount head 34 to a position generally coinciding with the raised reverse position 44 mentioned above. The forward side 48 of the elbow may encounter the upper rim 65 of the vertical wall 84. On the other hand, the obstruction of the shoulder portion 56 encountered by the device mount head 34, and specifically the rear face 54 of the joint arm 40, defines the rotational limit of the device mount head 34 to a position generally coinciding with the lowered forward position 46. The illustrated specifics of the lid 26 as pertaining to its liquid delivery, stopper, and other functionalities not pertaining to the device mount head 34 is presented by way of example only and not of limitation. It will be recognized by those having ordinary skill in the art that there are wide range of designs for lids 26 utilized in connection with water bottles/container 10, and the features of the device mount head 34 and the dynamic coupling to the lid 26 may be adapted to such alternative designs.

Figure 3:
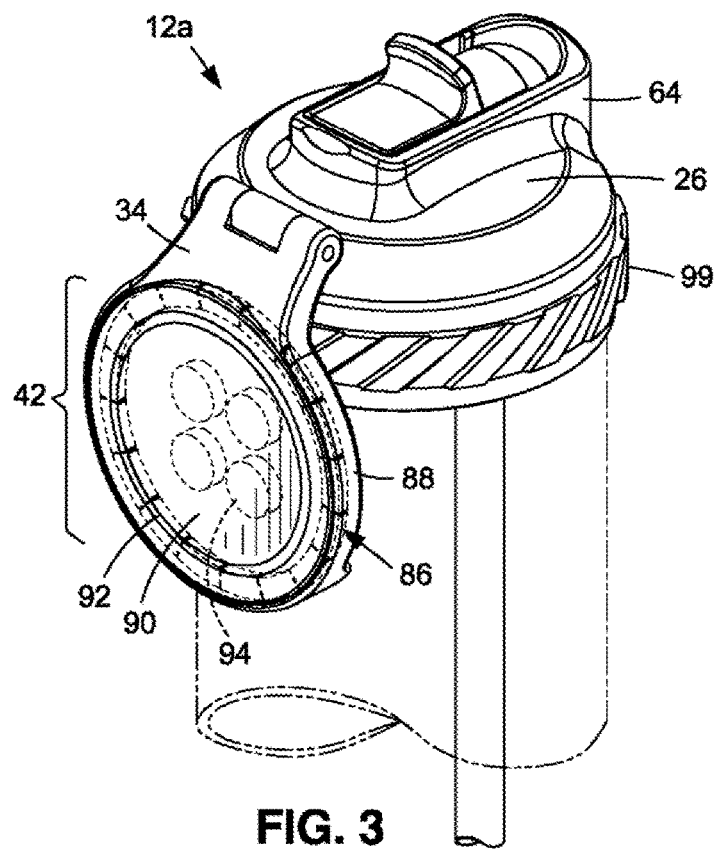
FIG. 3 is a perspective view of the first embodiment of the container magnetic mount with the device mount head in the forward lowered position.

FIG. 3 illustrates the generally circular shape of the head body 42, which is sized to have a diameter that is greater than the width w of the spout platform 64 while being less than the diameter of the lid 26. The head body 42 may be further defined by an outer frame 86 with a circular sidewall 88, along with a thinner puck structure 90 centrally located within the bounds of the outer frame 86. Spaced around the circumference of the outer frame 86 may be a series of permanent magnet elements 92 that are attractive of the ferromagnetic element of the device 14. The permanent magnet elements 92 may be of any suitable magnetic material, including composites, rare earth elements, and so forth. In addition to the permanent magnet elements 92 positioned around the circumference of the outer frame 86, the puck structure 90 may also include a set of permanent magnet elements 94. These may be disc-shaped and embedded into the puck structure 90, specifically near and clustered around a center region thereof. The quantity and relative size of the permanent magnet elements 94 are presented by way of example only, and the embodiments of the present disclosure need not be limited to such configuration. While the head body 42 has been described in terms of the discrete components of the outer frame 86 and the puck structure 90, this is by way of example only. These two components may be integrally constructed, that is, define a single unitary structure, but may be comprised of different sections, segments or parts corresponding thereto.

Referring back to FIG. 2A and FIG. 2B, the circular sidewall 88 may have a thin section 96 and a thick section 98. Although the puck structure 90 defines a thickness that may be coextensive with the thickness of the thin section 96, it is not understood to have a differing thickness at the thick section 98. Thus, the thick section 98 may define a lip 100 that aids in the manual carrying of the device mount head 34 with it being in the raised reverse position 44, as well as in the manual rotation of the same from the lowered forward position 46 to the raised reverse position 44, or somewhere in between. Reference herein to the thin section 96 and the thick section 98 is understood to be only in relation to each other, in that the thin section 96 has a reduced thickness relative to the thick section 98. The specific difference in thicknesses is immaterial, however.

As shown in the various embodiments, there may be an annular grip 99 that encircles the rim cylindrical wall 28. The grip 99 may be constructed of an elastic, elastomeric, or another type of material that has a higher coefficient of friction than the metal of the rim cylindrical wall 28 to provide improved grip when removing/installing the lid 26 on to the liquid container 10. The grip 99 may be a separate component from the lid 26, co-molded into the lid 26, or be constructed of the same material as the lid 26, with the additional friction being provided by an external pattern imprinted or molded on the grip 99 that increases its surface area.

Figure 4:
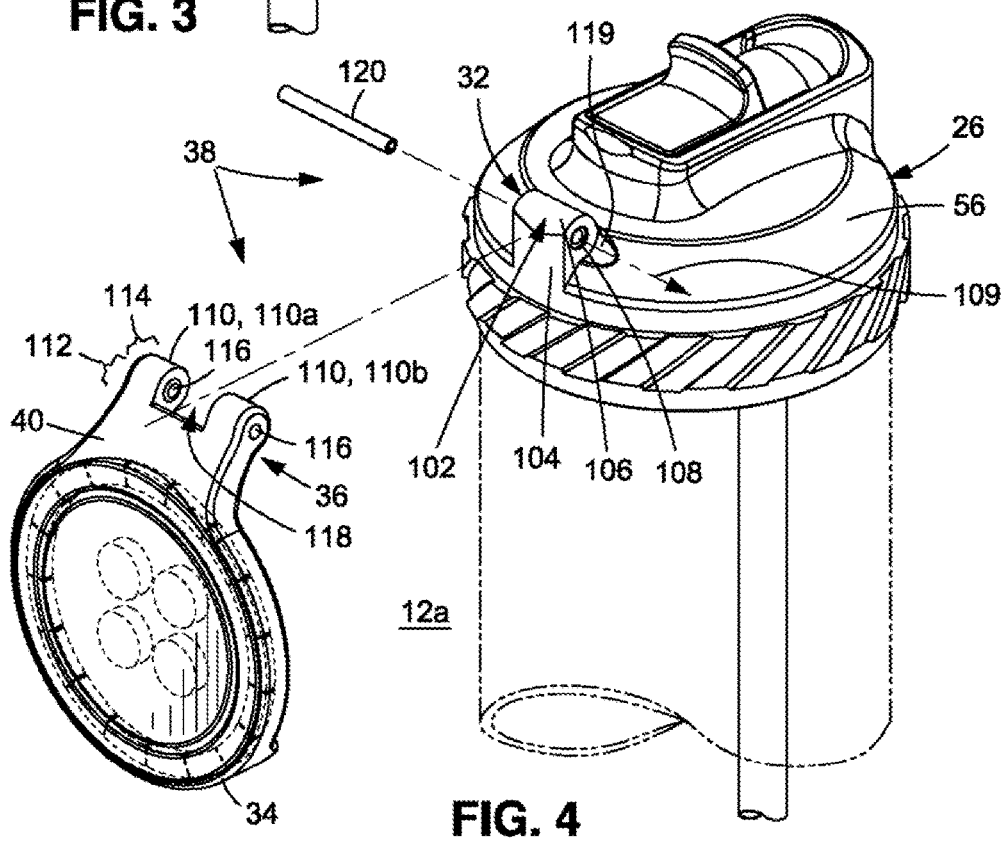
FIG. 4 is an exploded perspective view of the first embodiment of the container magnetic mount with the device mount head separated from the lid.

FIG. 4 illustrates one variation of the dynamic coupling 38 that is generally defined by the lid joint element 32 and the device mount head joint element 36. In further detail, the lid joint element 32 can be a single lid hinge knuckle 102 that extend from the shoulder portion 56, or any other suitable part of the lid 26. The lid hinge knuckle 102 is defined by the vertical wall 104 that is generally coplanar with the rim cylindrical wall 28 of the lid 26, as well as a radiused portion 106. Defined in the lid hinge knuckle 102, and located centrally relative thereto is a transverse lid hinge barrel 108 having a barrel axis 109.

The device mount head joint element 36, on the other hand, may be a pair of axially aligned mount head hinge knuckles 110 that extend from joint arm 40. In the illustrated embodiment, there may be a left mount head hinge knuckle 110a and a right mount head hinge knuckle 110b. The mount head hinge knuckles 110 are each defined by a straight wall 112 and a radiused portion 114. The straight wall 112 is understood to be coplanar or tangent with the joint arm 40. In this regard, the joint arm 40 may also be referred to as a hinge leaf 113. Generally centered in each of the mount head hinge knuckles 110 are mount head hinge barrels 116 that are coaxial to each other. Although a configuration of a single lid hinge knuckle 102 and a pair of mount head hinge knuckles 110 is presented, there may be more than one lid hinge knuckle, or only a single mount head hinge knuckle.

An open slot 118 that separates the left and right mount head hinge knuckle 110a, 110b is sized and configured to receive the lid hinge knuckle 102. Furthermore, the shoulder portion 56 defines a chord notch 119 on each side of the lid hinge knuckle 102. The chord notch 119 may have a generally cylindrical configuration that matches that of the radiused portions 114 of the mount head hinge knuckles 110. The chord notch 119 thus acts as a bearing surface upon which the mount head hinge knuckles 110 rotate.

When coupled, the mount head hinge barrels 116 and the lid hinge barrel 108 are understood to be axially aligned, such that a hinge pin 120 may be inserted through each. The diameter of the lid hinge barrel 108 is understood to be slightly greater than the diameter of the hinge pin 120, such that free rotational movement is possible. However, in some embodiments, the diameter of the lid hinge barrel 108 may be sized for a slight friction fit with the hinge pin 120. Along these lines, the mount head hinge barrels 116 are likewise sized for a frictional retention fit with the hinge pin 120.

Figure 5:
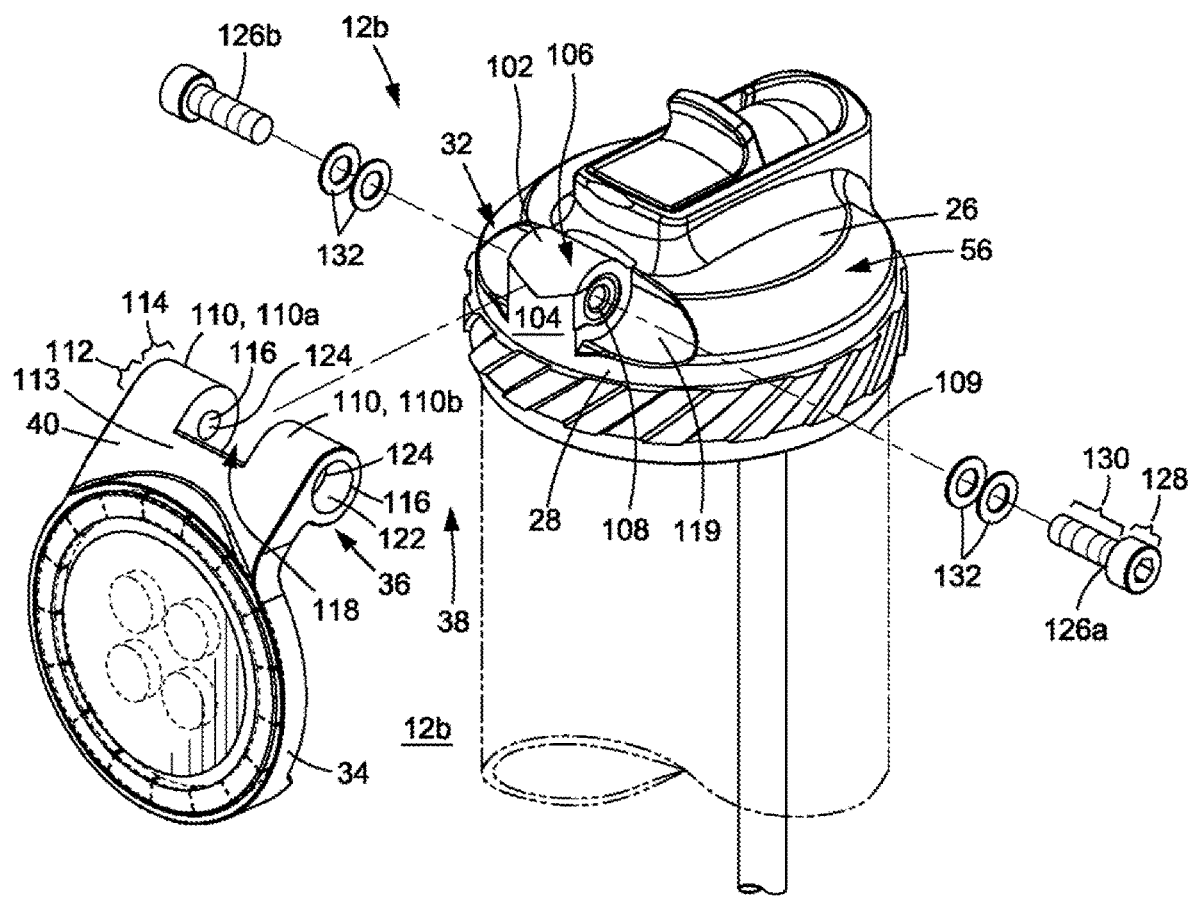
FIG. 5 is an exploded perspective view of a second embodiment of the container magnetic mount with the device mount head separated from the lid.

FIG. 5 illustrates a second embodiment of the container magnetic mount 12b with a differently configured dynamic coupling 38. The shoulder portion 56 of the lid 26 defines a more pronounced or deeper/wider chord notch 119, and extending centrally therefrom is the lid hinge knuckle 102. Similar to the first embodiment, the lid hinge knuckle 102 is defined by the vertical wall 104 that is generally coplanar with the rim cylindrical wall 28 of the lid 26. The lid hinge knuckle 102 also has the radiused portion 106. Defined in the lid hinge knuckle 102, and located centrally relative thereto is the transverse lid hinge barrel 108 having a barrel axis 109. For reasons detailed more fully below, the lid hinge barrel 108 may be threaded, with the threading extending across the width of the lid hinge knuckle 102.

The device mount head joint element 36 includes a pair of axially aligned mount head hinge knuckles 110 that extend from the joint arm 40/hinge leaf 113. Thus, there is a left mount head hinge knuckle 110a and a right mount head hinge knuckle 110b. The mount head hinge knuckles 110 are each defined by the straight wall 112 and a radiused portion 114. The straight wall 112 is understood to be tangent to the hinge leaf 113. In this regard, the joint arm 40 may also be referred to as a hinge leaf 113. Again, although a configuration of a single lid hinge knuckle 102 and a pair of mount head hinge knuckles 110 is presented, there may be more than one lid hinge knuckle, or only a single mount head hinge knuckle.

Generally centered in each of the mount head hinge knuckles 110 are mount head hinge barrels 116 that are coaxial to each other. Unlike the first embodiment of the container magnetic mount 12 described above, however, the mount head hinge barrels 116 are defined by outer knuckle barrel 122 and an inner knuckle barrel 124 that is located towards the open slot 118. The outer knuckle barrel 122 has a larger diameter than the inner knuckle barrel 124.

The open slot 118 that separates the left and right mount head hinge knuckle 110a, 110b is sized and configured to receive the lid hinge knuckle 102. Again, the chord notch 119 can have a generally cylindrical configuration that matches that of the radiused portions 114 of the mount head hinge knuckles 110, with the chord notch 119 acting as the bearing surface upon which the mount head hinge knuckles 110 rotate.

When coupled, the mount head hinge barrels 116 and the lid hinge barrel 108 are understood to be axially aligned.

Inserted from the outer left and right sides of the respective mount head hinge knuckles 110a, 110b, are corresponding threaded bolts 126a, 126b. The threaded bolts 126 are understood to be defined by a bolt head 128 and a threaded bolt shaft 130, with the bolt shaft 130 having a lesser diameter than the bolt head 128. The bolt head 128 is configured to be received within the outer knuckle barrel 122 but not the inner knuckle barrel 124, while the bolt shaft 130 is configured to be received through the outer knuckle barrel 122 and the inner knuckle barrel 124, and then into the threaded lid hinge barrel 108. A pair of washers 132 may buffer the bolt head 128 against the interior bottom of the outer knuckle barrel 122. The bolts 126 are thus understood to rotatably couple the mount head hinge knuckles 110 to the lid hinge knuckle 102. With the bolts 126 torqued down into the lid hinge barrel 108, a compressive force is imparted from the mount head hinge knuckles 110 to the opposed sides of the lid hinge knuckle 102. This compressive force is understood to impart a tendency to retain the device mount head 34 to the lid 26 in a static orientation. With the application of a suitable amount of force, the device mount head 34 may be rotated/re-oriented to a desired angle. Those having ordinary skill in the art will recognize the range of torque specifications for the bolts 126 that make such a functionality possible. Along these lines, it will also be appreciated that other conventional braking mechanisms such as counter-angled splines incorporated into the abutting faces of the knuckles may also be utilized.

Figure 6:
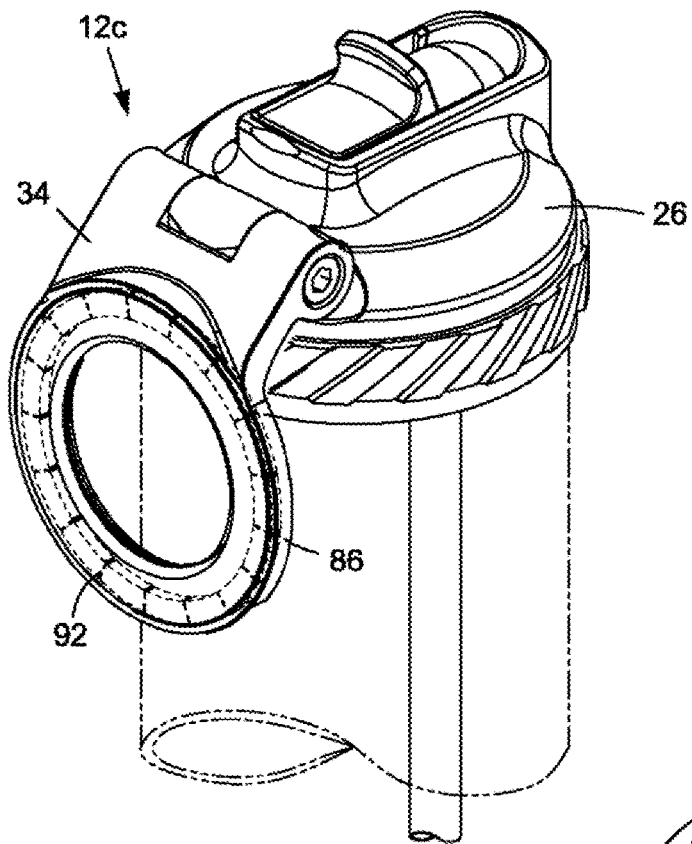
FIG. 6 is a perspective view of a third embodiment of the container magnetic mount.

In the first and second embodiments of the container magnetic mount 12a, 12b described above, the device mount head 34 was comprised of the outer frame 86 and the central puck structure 90. A first set of the permanent magnet elements 92 were disposed around the circumference of the outer frame 86, while another second set of permanent magnet elements 94 were clustered in the center of the puck structure 90. A third embodiment of the container magnetic mount 12c shown in FIG. 6 may eliminate the puck structure 90, leaving only the annular structure of the outer frame 86. The first set of permanent magnet elements 92 continue to be positioned around the circumference of the outer frame 86 and are understood to be attractive of the ferromagnetic elements on the device 14. In this configuration, the device mount head 34 may be usable as a carry handle, or as the structure to grasp for rotating the device mount head from the raised reverse position 44 and the lowered forward position 46, as well as any orientation in between. In all other respects, however, the third embodiment of the container magnetic mount 12c is understood to be the same as the second embodiment 12b.

Figure 7:
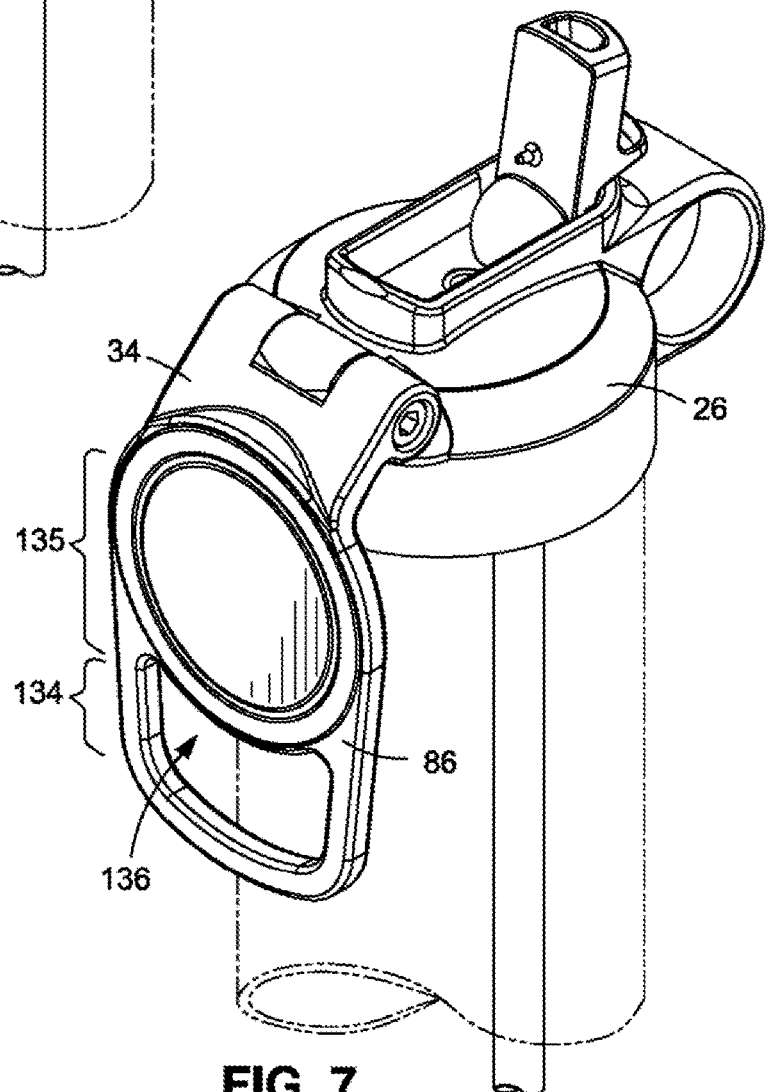
FIG. 7 is a perspective view of a fourth embodiment of the container magnetic mount.

A fourth embodiment of the container magnetic mount 12c shown in FIG. 7 is likewise comprised of the lid 26 that is rotatably engaged to a variation of the device mount head 34. The dynamic coupling 38 is understood to be the same as in the second and third embodiments 12b, 12c described above, but the outer frame 86 includes an additional handle extension 134 from the annular portion. The handle extension 134 defines an opening 136 that may be grasped for carrying the container magnetic mount 12, or to rotate the same between the raised reverse position 44 and the lowered forward position 46. This fourth embodiment 12d retains the central puck structure 90 with the secondary magnetic elements (not shown) embedded and clustered in a central region thereof. Moreover, the first set of magnetic elements (not shown) are understood to be disposed around the circumference of the outer frame 86. The specific size and shape of the handle extension 134 is presented by way of example only and not of limitation, and any other structure that aids in the carry and/or support of the device 14 may be utilized without departing from the present disclosure.

Utilizing the container magnetic mount 12 in accordance with various embodiments of the present disclosure, the device mount head 34 and the device 14 attached thereto may be oriented with the display 16 generally toward the forward side 48 of the liquid container 10, as shown in FIG. 1. This may be appropriate while storing or transporting the combination of the device 14 and the liquid container 10. There may also be a slightly greater angular range between the lowered forward position 46 and laying flat, as opposed to the stopping angle just short of 90 degrees with the raised reverse position 44. Accordingly, for some applications in which a vertical orientation is needed (e.g., the container 10 is positioned at a higher location, or the container magnetic mount 12 substitutes for a monopod/tripod) the lowered forward position 46 may be the more appropriate. The device mount head 34 and the device 14 may also be oriented with the display 16 generally toward the rearward side 50 of the liquid container 10. This orientation may be suitable when immediate access to the spout 68 is desired while viewing or recording content, such as while participating in videoconferences during exercise activities. It will be appreciate that these uses cases are exemplary only, and there may be other scenarios in which one orientation or another is more suitable. Those having ordinary skill in the art will recognize and appreciate such alternatives.

Figure 8:
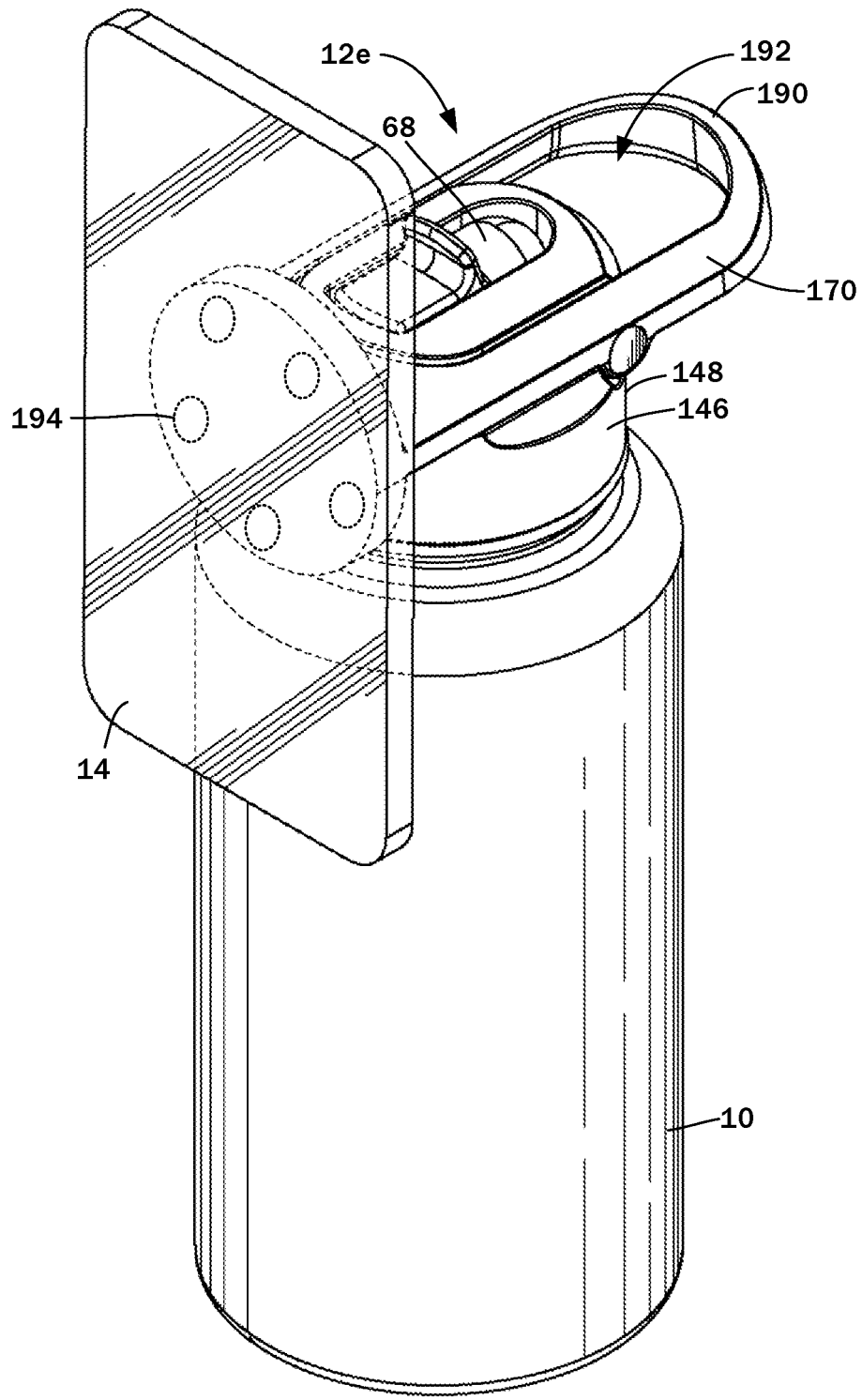
FIG. 8 is a front perspective view of a fifth embodiment of the container magnetic mount.

Referring now to FIG. 8, another variation of a lid 146 with a fifth embodiment of the container magnetic mount 12e is shown coupled to the liquid container 10. Although some features of the lid 146 are common to the lid 26 described in the context of other embodiments, there are several differences stemming from the alternative configuration of the container magnetic mount 12e detailed below. The lid 146 is similarly defined by a cylindrical wall 148 that may be generally analogous to the rim cylindrical wall 28 of the lid 26, along with a top 150.

Figure 9:
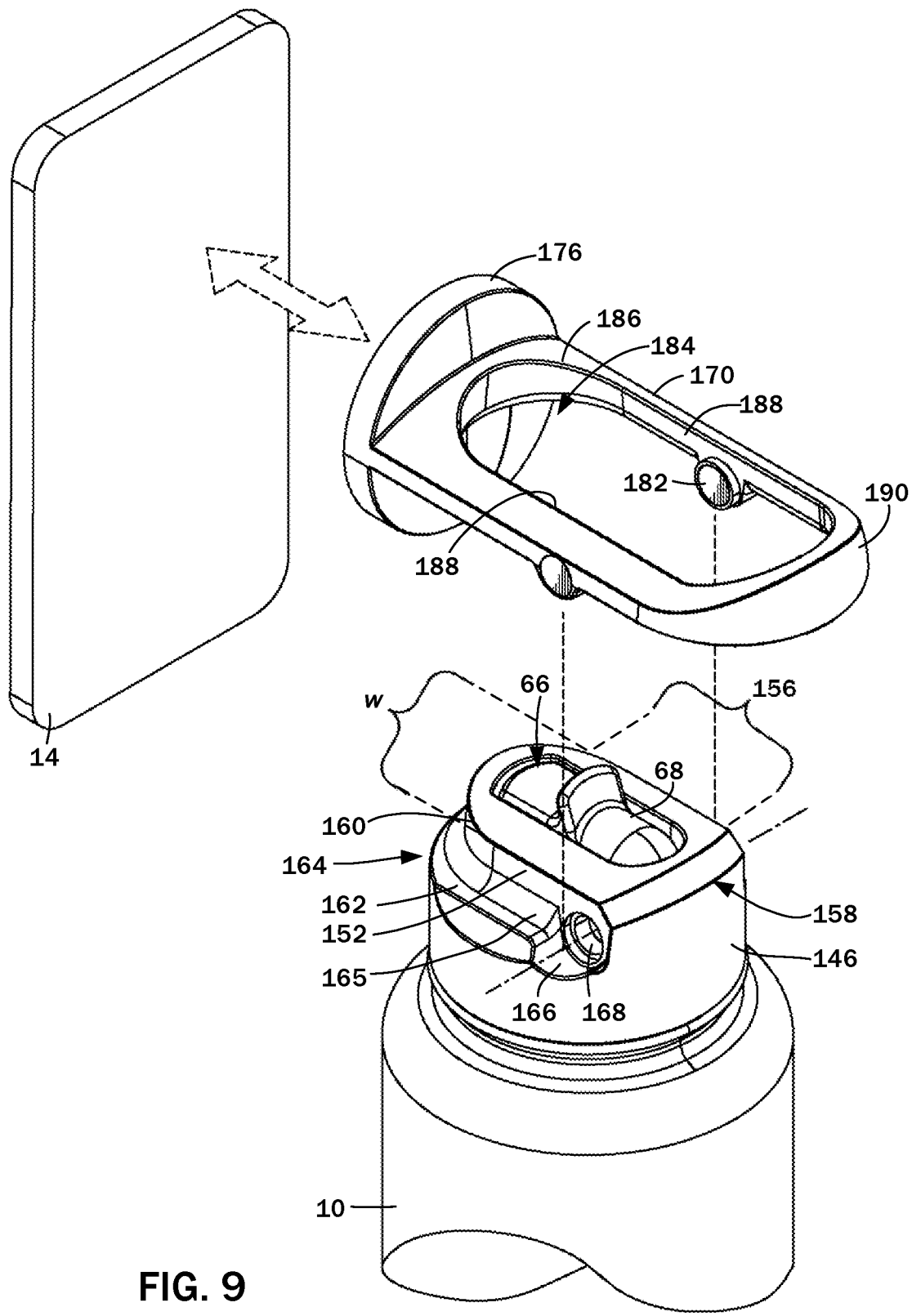
FIG. 9 is a partially exploded rear perspective view of the fifth embodiment of the container magnetic mount.

With additional reference to FIG. 9, the top 150 is characterized by a raised platform 152 with a semicircle end 154 and an elongated section 156 that terminates at an arcuate end 158 opposing the semicircle end 154. The arcuate end 158 is contiguous with the cylindrical wall 148, in that the cylindrical wall 148 defines and is a part of the arcuate end 158 of the raised platform 152. The semicircle end 154 defines a platform width w, while the platform length is the sum of the elongated section 156 and the radius of the semicircle corresponding to the semicircle end 154.

The top 150, that is, the raised platform 152 defines the spout receptacle 66 that accepts the rotatable spout 68, which is in fluid communication with the straw or conduit extending into the interior of the liquid container 10. The spout 68 is understood to be identical to the one described above, and so for the sake of brevity, the structural and functional details thereof will be omitted. It will be appreciated by those having ordinary skill in the art that a different type of spout may be substituted without departing from the scope of the present disclosure, so long as it may be contained within the spout receptacle 66.

A shoulder section 164 extends around the cylindrical wall 148 and the raised platform 152, with a vertical portion 160 defining the outline of the raised platform 152 and a flat portion 162 defining a partial outline of the cylindrical wall 148. Between the vertical portion 160 and the flat portion 162 there may be a chamfer 165 that connects to the two portions. Although the vertical portion 160 continues around the raised platform 152 to the arcuate end 158, the flat portion 162 terminates short of the arcuate end 158. This part of the lid 146 defines a chord notch 166. The raised platform 152 defines transverse bearing recesses 168, and the chord notch 166 is understood to be coaxial therewith. Although FIG. 9 only shows a first one of the transverse bearing recesses 168 and first one of the chord notches 166, corresponding structures are understood to exist on the opposite side of the raised platform 152.

The fifth embodiment of the device mount 12e additionally includes an elongate bail arm 170 that is in rotating engagement with the lid 146 in an offset and counterbalanced relation. As best illustrated in the side view of FIG. 10, the liquid container 10 and the lid 146 defines a center axis 172. The elongate bail arm 170 is mounted at a position 174 that is offset to the right (relative to the perspective of FIG. 10) from the center axis 172. The portion of the elongate bail arm 170 to the right of the mounting position 174 is counterbalanced by the longer portion of the elongate bail arm 170 to the left of the mounting position 174, as well as by a device mount head 176.

In further detail, the device mount head 176 is fixed at a head end 178 that is opposite the tail end 180 toward the offset bias, that is, the side toward which the mounting position 174 is biased. The device mount head 176 is fixed at a proscribed angle to the elongate bail arm 170, which in the illustrated example, is perpendicular or 90 degrees. This specific configuration is by way of example only and not of limitation, and any other desirable angular relationship between the elongate bail arm 170 and the device mount head 176 may be substituted. The center of the device mount head 176 is slightly higher than the center of the elongate bail arm 170.

Referring again to FIG. 9, the mounting position 174 generally coincides with the aforementioned bearing recess 168. The elongate bail arm 170 includes a pair of inwardly opposing journals 182 that are received within the bearing recess 168 when the elongate bail arm 170 is rotatably engaged to the lid 146. Again, while FIG. 9 only shows one of the journals 182, there is understood to be a corresponding one on the opposite side of the elongate bail arm 170. The elongate bail arm, which may be more generally referred to as an arm joint element, is in rotating engagement with the lid 146. The journals 182 of the elongate bail arm 170 is understood to be a lever arm joint element, while the bearing recess 168 is understood to be a lid joint element. The lever arm joint element and the lid joint element, in turn, define a dynamic coupling with the elongate bail arm 170/lever arm being orientable between one or more arbitrary raised positions and a lowered position.

As utilized herein, an arbitrary raised position refers to the capability of positioning the elongate bail arm 170 at any angle since the range of motion of the journals 182 is continuous with respect to the bearing recess 168, and without specific angular stop positions. However, it will be appreciated that there may be alternative rotating engagements such as counter-angled splines and the like may be utilized, which can lock the elongate bail arm 170 to specific angular stop positions. The reference to arbitrary raised position is intended to encompass such alternative configurations, even though in the narrowed sense an "arbitrary" positioning is not possible. For purposes of the present disclosure, arbitrary positioning is intended to mean more than one available position. In this regard, the journal 182/bearing recess 168 is contemplated to be one possible type of dynamic coupling, though those having ordinary skill in the art will readily ascertain other types of dynamic couplings that enable such a rotating engagement between the elongate bail arm 170 and the lid 146.

Furthermore, while the illustrated embodiment contemplates a frictional fit between the journals 182 and the bearing recesses 168 to maintain a selected arbitrary position, other braking/locking mechanisms for securing the elongate bail arm 170 to the lid 146 may be incorporated. Such mechanisms are deemed to be within the purview of one having ordinary skill in the art and will not be described in further detail. Nevertheless, the embodiments of the present disclosure are intended to encompass such features on an optional, not mandatory or required basis.

Figure 10:
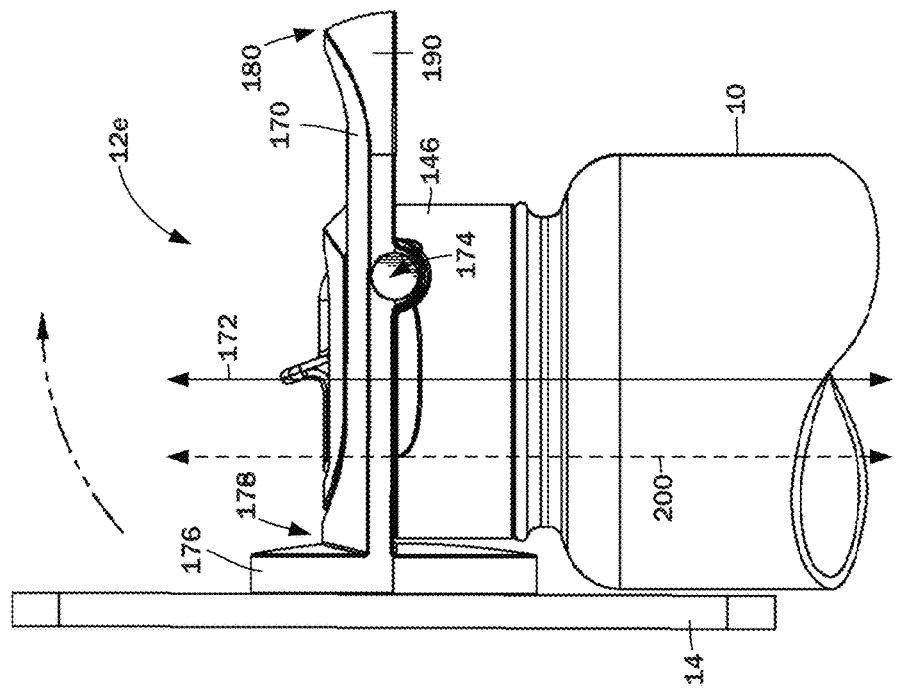
FIG. 10 is a side view of the fifth embodiment of the container magnetic mount in a lowered position.

FIG. 10 in particular illustrates the elongate bail arm 170 in the lowered position. As illustrated in FIG. 9, the elongate bail arm 170 defines an opening 184 through which the raised platform 152 may pass while the elongate bail arm 170 is in the lowered position. The outline of the opening 184 is understood to generally correspond to the shape of the raised platform 152, and thus defines a semicircular edge 186 that conforms to the shape of the semicircle end 154 of the raised platform 152, and elongate edges 188 that conforms to the elongated section 156 of the raised platform 152. Preferably, though optionally, the upper contour of the raised platform 152 may be contiguous with the upper contour of the elongate bail arm 170 such that an appearance of continuity between such features is imparted. The specific appearance of the contour, however, is a matter of aesthetic design choice and any suitable shape or contour may be utilized.

In the fifth embodiment of the device mount 12e, the elongate bail arm 170 is in rotating engagement with the lid 146 in an offset and counterbalanced relationship. In the lower position shown in FIG. 10, between the combined weight of the device 12, the device mount head 176, and the extended moment of the lengthened portion of the elongate bail arm 170 relative to the mounting position 174, the center of gravity 200 is at a position offset to the left of the center axis 172 of the liquid container 10. Despite the offset of the center of gravity, stability may be maintained because of the stable positioning of the elongate bail arm 170 relative to the lid 146 and the liquid container 10.

Figure 11:
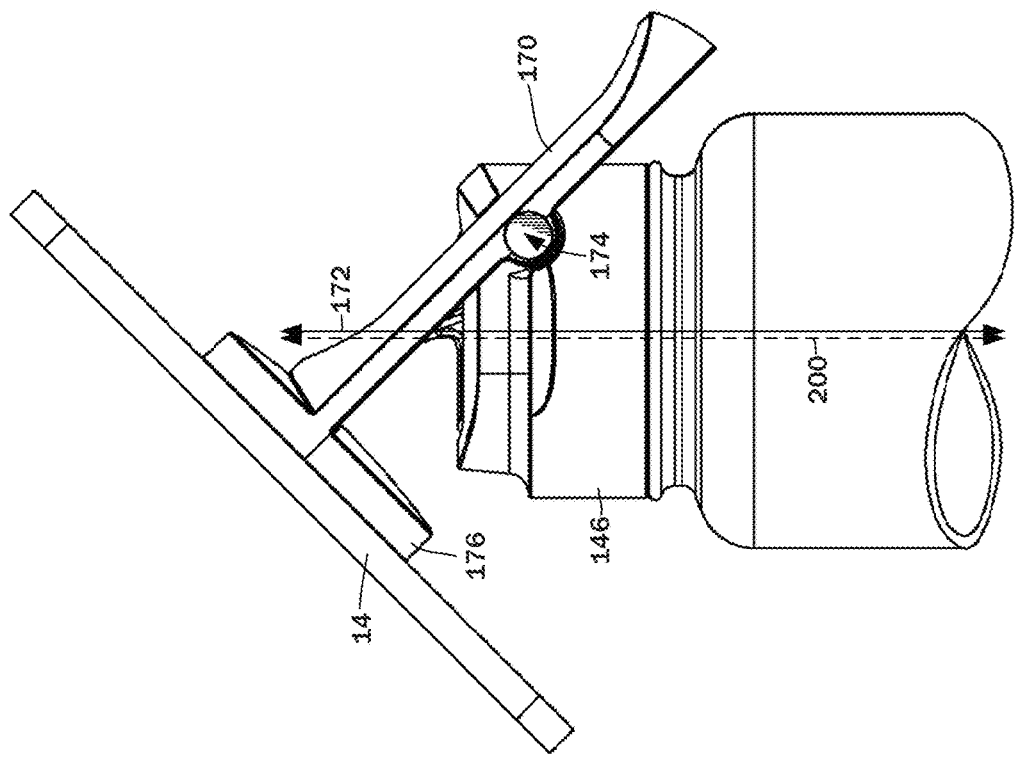
FIG. 11 is a side view of the fifth embodiment of the container magnetic mount in a raised position.

As the elongate bail arm 170 is rotated with the device 12 being angled upward per the illustration of FIG. 11, the center of gravity 200 is shifted more toward the true center of the liquid container 10. Although the stability of the assembly has been decreased by virtue of its extended/rotated out arm 170, this shift in the center of gravity 200 is understood to compensate therefor and maintain stability.

The elongate bail arm 170 further defines a handle portion 190 that extends beyond the arcuate end 158 of the raised platform 152. With additional reference back to FIG. 8, there is understood to be a finger loop 192 defined by the elongate bail arm 170 that may be grasped by the user to carry the entire assembly of the liquid container 10 and the lid 146, or to rotate the elongate bail arm 170/device mount head 176. Like the upper contours of the elongate bail arm 170 and the raised platform 152, it is to be understood that the specific appearance of the handle portion 190 is also a matter of aesthetic design choice and any other desirable shape may be substituted without departing from the present disclosure.

The device mount head 176 includes one or more permanent magnet elements 194 that are attractive of a ferromagnetic element attached to a structure such as the device 14. Although it is illustrated that the permanent magnet elements 194 are positioned around the circumference of the device mount head 176, this is by way of example only. A cluster of multiple permanent magnet elements 194 may be positioned in a central region with the front face being arranged with opposite polarities. The device mount head 176 may have a variety of structural configurations to hold the permanent magnet elements 194 in the specific arrangement, such as frames with compartments sized and shaped to accommodate the permanent magnet elements 194. Along these lines, the circular shape of the device mount head 176 is presented for exemplary purposes only, and any other suitable shape may be utilized. Additional elastic or elastomeric materials may be used as covers to protect the surface of the device 14. While the present disclosure describes the device mount head 176 being used to secure a device 14 thereto, the uses for the container magnetic mount 12 need not be limited thereto. The entire assembly of the liquid container 10, and the container magnetic mount 12 may be secured to a ferromagnetic structure such as gym equipment.

The particulars shown herein are by way of example and for purposes of illustrative discussion of the embodiments of a container magnetic device mount and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A container magnetic mount engageable to a structure, comprising:
    a container lid; and
    a device mount with an elongate bail arm in rotating engagement with the container lid in an offset and counterbalanced relation and a mount head including one or more magnets attractive of a ferromagnetic element on the structure, the mount head being fixed at a head end opposite a tail end toward the offset bias and at a proscribed angle relative to the elongate bail arm.

2. The container magnetic mount of claim 1, wherein the container lid is defined by a rim cylindrical wall and a raised fluid passageway platform.

3. The container magnetic mount of claim 2, wherein the raised fluid passageway platform defines a pair of opposed transverse bearing recesses.

4. The container magnetic mount of claim 3, wherein the elongate bail arm includes a pair of inwardly opposing journals received within the bearing recesses in the raised fluid passageway platform.

5. The container magnetic mount of claim 3, wherein the container lid defines a pair of chord notches coaxial with the respective transverse bearing recesses.

6. The container magnetic mount of claim 2, wherein the elongate bail arm defines an opening generally corresponding to the raised fluid passageway platform.

7. The container magnetic mount of claim 6, wherein the elongate bail arm is flush with the raised fluid passageway platform.

8. The container magnetic mount of claim 1, wherein the mount head is fixed in a perpendicular relationship to the elongate bail arm.

9. The container magnetic mount of claim 1, wherein the mount head is fixed vertically offset center of the elongate bail arm.

10. A liquid container, comprising:
    a container body defined by a container interior and an open rim;
    a lid engageable to the open rim of the container body, the lid being defined by a rim cylindrical wall and a top including a platform having a rotatable spout in fluid communication with the container interior;
    a device mount with an elongate bail arm in rotating engagement with the lid in an offset and counterbalanced relation and a mount head including one or more magnets attractive of a ferromagnetic element on the structure, the mount head being fixed at a head end opposite a tail end toward the offset bias and at a proscribed angle relative to the elongate bail arm.

11. The liquid container of claim 10 wherein the platform of the lid defines a pair of opposed transverse bearing recesses.

12. The liquid container of claim 11, wherein the elongate bail arm of the device mount includes a pair of inwardly opposing journals received within the bearing recesses in the platform.

13. The liquid container of claim 11, wherein the lid defines a pair of chord notches coaxial with the respective transverse bearing recesses.

14. The liquid container of claim 10, wherein the elongate bail arm defines an opening generally corresponding to the raised fluid passageway platform.

15. The liquid container of claim 10, wherein the mount head is fixed in a perpendicular relationship to the elongate bail arm.

16. A container magnetic mount, comprising:
    a container lid defined by a rim cylindrical wall, a top, and a lid joint element;
    a lever arm including an arm joint element in rotating engagement with the container lid, the arm joint element including a pair of arm shafts offset from a center thereof, the lid joint element and the lever arm joint element defining a dynamic coupling with the lever arm being orientable between one or more arbitrary raised positions and a lowered position; and
    a device mount head integrated with the lever arm and including one or more magnets attractive of a ferromagnetic element on the device, a face of the device mount head being at a prescribed angle relative to the lever arm.

17. The container magnetic mount of claim 16, wherein the container lid defines a pair of opposed transverse bearing recesses receptive to a corresponding one of the pair of arm shafts, the opposed transverse bearing recesses being defined offset from a center of the container lid.

18. The container magnetic mount of 16, wherein the lever arm defines a central opening receptive to the top of the lid.

19. The container magnetic mount of claim 16, wherein the top of the container lid includes a rotatable spout.

* * * * *